United States Patent

Yim

[19]

[11] Patent Number: 5,917,950
[45] Date of Patent: Jun. 29, 1999

[54] IMAGE DECODING APPARATUS HAVING FRAME RATE TRANSFORMATION FUNCTION

[75] Inventor: Myung-sik Yim, Seoul, Rep. of Korea

[73] Assignee: Samsung Electronics Co., Ltd., Kyungki-do, Rep. of Korea

[21] Appl. No.: 08/723,772

[22] Filed: Sep. 30, 1996

[30] Foreign Application Priority Data

Sep. 29, 1995 [KR] Rep. of Korea ...................... 95-33033

[51] Int. Cl.[6] ...................................... H04N 7/01
[52] U.S. Cl. ........................ 382/236; 348/440; 358/486
[58] Field of Search .................................. 382/232, 236; 358/486, 139; 348/440, 443, 447, 504, 509, 543

[56] References Cited

U.S. PATENT DOCUMENTS 5,453,792   9/1995   Gifford et al. ......................... 348/441

FOREIGN PATENT DOCUMENTS

| 1 270 552 | 4/1972 | United Kingdom . | |
| 1 306 130 | 2/1973 | United Kingdom | H04N 9/42 |
| 2 016 858 | 9/1979 | United Kingdom | H04N 5/02 |
| 2 154 825 | 9/1985 | United Kingdom | H04N 5/783 |

*Primary Examiner*—Scott Rogers
*Assistant Examiner*—Stephen Brinich
*Attorney, Agent, or Firm*—Sughrue, Mion, Zinn Macpeak & Seas, PLLC

[57] ABSTRACT

An image decoding apparatus having a frame rate transform function includes a first frame rate generator for generating a frame rate of a received coded image signal, a second frame rate generator for generating a frame rate of an image display device, and a frame rate transformer for receiving the frame rates, and generating an omission control signal for omitting a predetermined frame when the frame rate of the input image signal is larger than the frame rate of the image display device, while generating a repetition control signal for repeating a predetermined frame when the frame rate of the image signal is smaller than the frame rate of the image display device, and outputting the generated omission control signal and the repetition control signal to the decoder.

8 Claims, 4 Drawing Sheets

IMAGE DECODING APPARATUS HAVING FRAME RATE TRANSFORMATION FUNCTION

BACKGROUND OF THE INVENTION

The present invention relates to an image decoding apparatus, and more particularly, to an image decoding apparatus having a frame rate transformation function in which an input image signal having a frame rate different from that of an image display device is transformed to have the frame rate of the image display device.

According to the development of recent satellite broadcasting, the satellite broadcasting of one country propagates into neighboring countries, and vice versa. Thus, it is expected that viewers would frequently view the satellite broadcasts from the neighboring countries, according to the various desires of viewers.

However, since TV receivers of each country are manufactured on the basis of each country's own TV broadcasting standard, only transmissions conforming to the broadcasting standard of a particular country can be displayed on TVs in that particular country. That is, an image signal broadcasted in accordance with one broadcasting standard cannot be viewed using a TV receiver designed for reception of a different broadcasting standard. In order to enable viewers to view a satellite broadcasting of a different standard, a broadcasting station needs to transform the frame rate of the image signal using an expensive transformation apparatus and re-record the transformed image signal The station then re-transmits the program to the TV receivers of each home in that country. In this case, only broadcasting programs whose frame rate have been transformed can be viewed. As a result, the viewers cannot freely view desired programs from different countries.

Because of the increase in satellite broadcasting, a demand has been developed for a TV receiver which can receive and display images irrespective of the broadcasting standard. This demand will be enhanced with the introduction of high-definition TV broadcasting

SUMMARY OF THE INVENTION

To answer the above demand, it is an object of the present invention to provide an image decoding apparatus having a frame rate transformation function which can transform a compressively coded input bitstream into a frame rate of an image display device and output the transformed bitstream, when a frame rate of the compressively coded input bitstream differs from that of the image display device.

To accomplish the above object of the present invention, there is provided an image decoding apparatus which transforms a coded image signal having a frame rate different from that of an image display device, so as to have the frame rate of the image display apparatus, the image decoding apparatus comprises:

decoding means for decoding the received coded image signal;

first frame rate generation means for generating a first frame rate of the coded image signal based on a predetermined reference clock signal;

second frame rate generation means for generating a second frame rate of an image display device based on the reference clock signal;

frame rate transformation means for receiving the first and second frame rates, respectively, generated from the first and second frame rate generation means, and generating an omission control signal for omitting a predetermined frame when the first frame rate is larger than the second frame rate, while generating a repetition control signal for repeating a predetermined frame when the first frame rate is smaller than the second frame rate; and image interfacing means for outputting a frame sequence output from the decoding means to match the frame rate of the image display device

BRIEF DESCRIPTION OF THE DRAWINGS

The preferred embodiments are described with reference to the drawings wherein.

DETAILED DESCRIPTION OF THE PREFERRED EMBODIMENT

A preferred embodiment of the present invention will be described below in more detail with reference to FIGS. 1 through 3.

Figure 1:
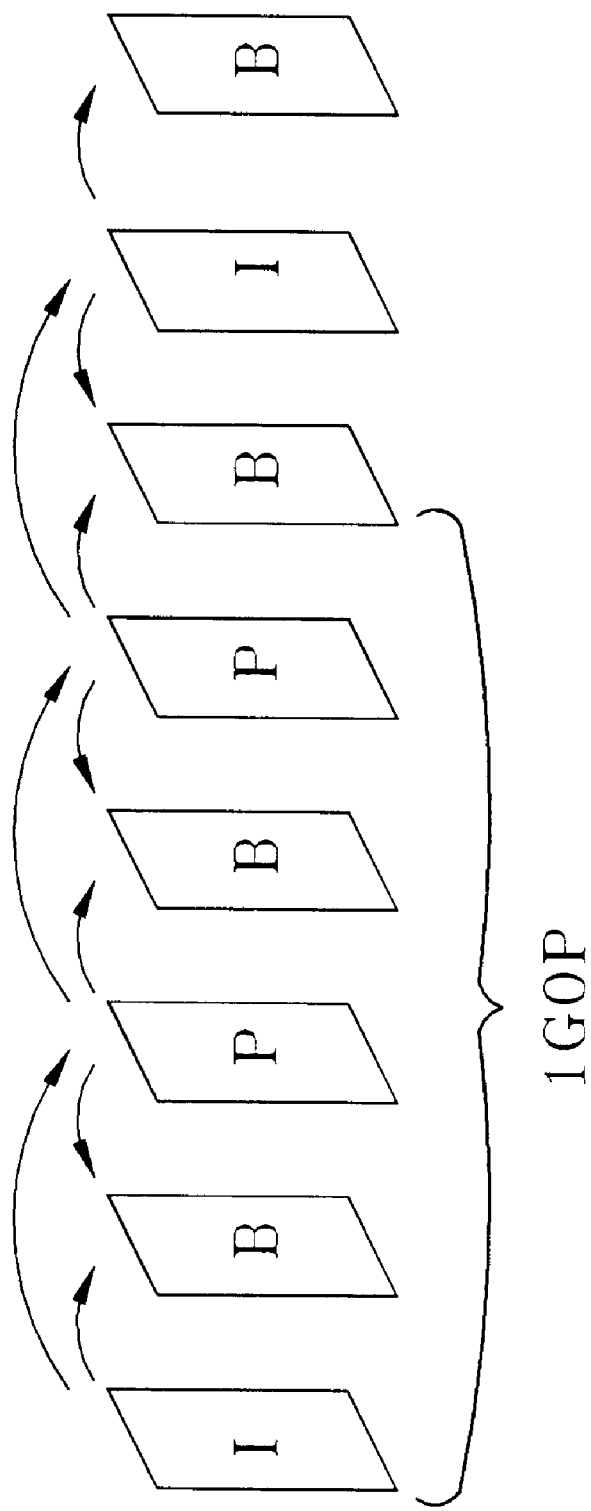
FIG. 1 is a view showing a frame arrangement of one group-of-pictures (GOP) layer according to the international standard of the moving picture experts group (MPEG).

Shown in FIG. 1 is an image frame arrangement of one group-of-pictures (GOP) layer according to the international standard of the moving picture experts group (MPEG) The GOP is composed of three kinds of frames. An intra-coded (I) frame is image data coded using only intra-frame information, a predictive-coded (P) frame is data obtained by coding a moving vector and the differential data using movement predicted from a previous I frame or P frame (see arrows), and a bidirectionally-coded (B) frame is data obtained by coding a moving vector and the differential data using movement predicted from a previous and following I frame or P frame (see arrows). As such, if an image is coded using interframe relevancy, the compression efficiency can be enhanced The present invention provides an apparatus which outputs a frame sequence to be coincident with a frame rate of an image display device when the frame rate of the input signal differs from that of the image display device.

Figure 2:
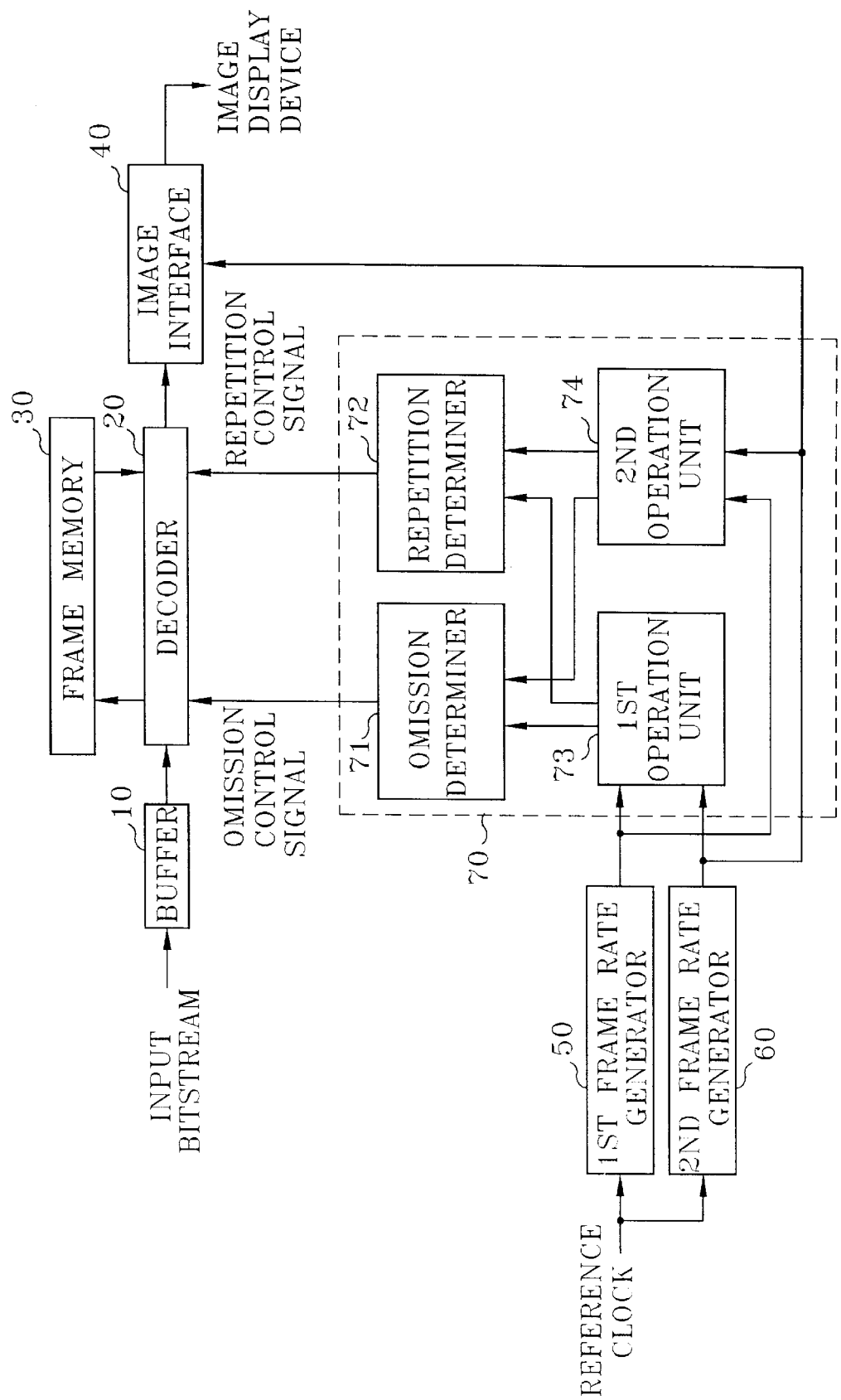
FIG. 2 is a block diagram of an image decoding apparatus having a frame rate transformation function according to a preferred embodiment of the present invention.

FIG. 2 is a block diagram of an image decoding apparatus having a frame rate transformation function according to a preferred embodiment of the present invention. In FIG. 2, an input buffer 10 receives a coded image signal and outputs the same to a decoder 20. The decoder 20 decodes the input image signal, and stores the decoding result in a frame memory 30. The decoder 20 reads out the stored decoded image signal from the frame memory 30 and outputs the read data to an image display device via an image interface 40.

Meanwhile, in the FIG. 2 apparatus, a first frame rate generator 50 receives a reference clock signal and generates a frame rate of the input bitstream, that is, a first frame rate. A second frame rate generator 60 also receives the reference clock signal and generates a frame rate of the image display device, that is, a second frame rate. The first and the second frame rate generators can be preprogrammed to output the appropriate frame rates. The frame rate transformer 70 receives the first and second frame rates respectively from the first and second frame rate generators 50 and 60, and generates a control signal for transforming the frame rate of the input bitstream into the frame rate of the image display device. The frame rate transformer 70 supplies the control signal to the decoder 20 which uses the same for controlling the output of the decoded image.

In more detail, a first operation unit 73 in the frame rate transformer 70 receives the first and second frame rates respectively from the first and second frame rate generators 50 and 60, and calculates a threshold value for determining an omission or repetition point of time of a frame output from the decoder 20. A second operation unit 74 therein calculates a delay time for delaying a predetermined frame of the input bitstream to be output as having a frame rate of the image display device. An omission determiner 71 receives the outputs of the first and second operation units 73 and 74 and determines the frame(s) to be omitted among the decoded frames. Likewise, a repetition determiner 72 receives the outputs of the first and second operation units 73 and 74 and determines the frame(s) to be repeated among the decoded frames.

The image interface 40 outputs the output of the decoder 20 to the image display device (not shown) according to the frame rate supplied from the second frame rate generator 60.

The operation of the FIG. 2 apparatus having the above-described structure will be described below with reference to FIGS. 3A and 3B.

The input buffer 10 in the FIG. 2 apparatus receives a bitstream of the compressively coded image signal and outputs the received image signal to the decoder 20. The decoder 20 performs a signal processing such as inverse quantization, inverse discrete cosine transform (IDCT) and motion compensation with respect to the input image signal from the input buffer 10, and decodes the received image signal into a prior-to-being compressively-coded image signal. The decoder 20 stores the decoded image signal in the frame memory 30.

The first frame rate generator 50 generates a frame rate of the input bitstream, that is, a first frame rate, based on a reference clock signal. The second frame rate generator 60 also generates a frame rate of the image display device, that is, a second frame rate, based on the reference clock signal. The frame rate transformer 70 receives the first and second frame rates respectively from the first and second rate generators 50 and 60, and generates a control signal for controlling the output of the decoder 20 based on the difference between two frame rates.

The operational principle of outputting an input image signal of a first frame rate to an image display device of a second frame rate will be described with reference to FIG. 3A.

Figure 3A:
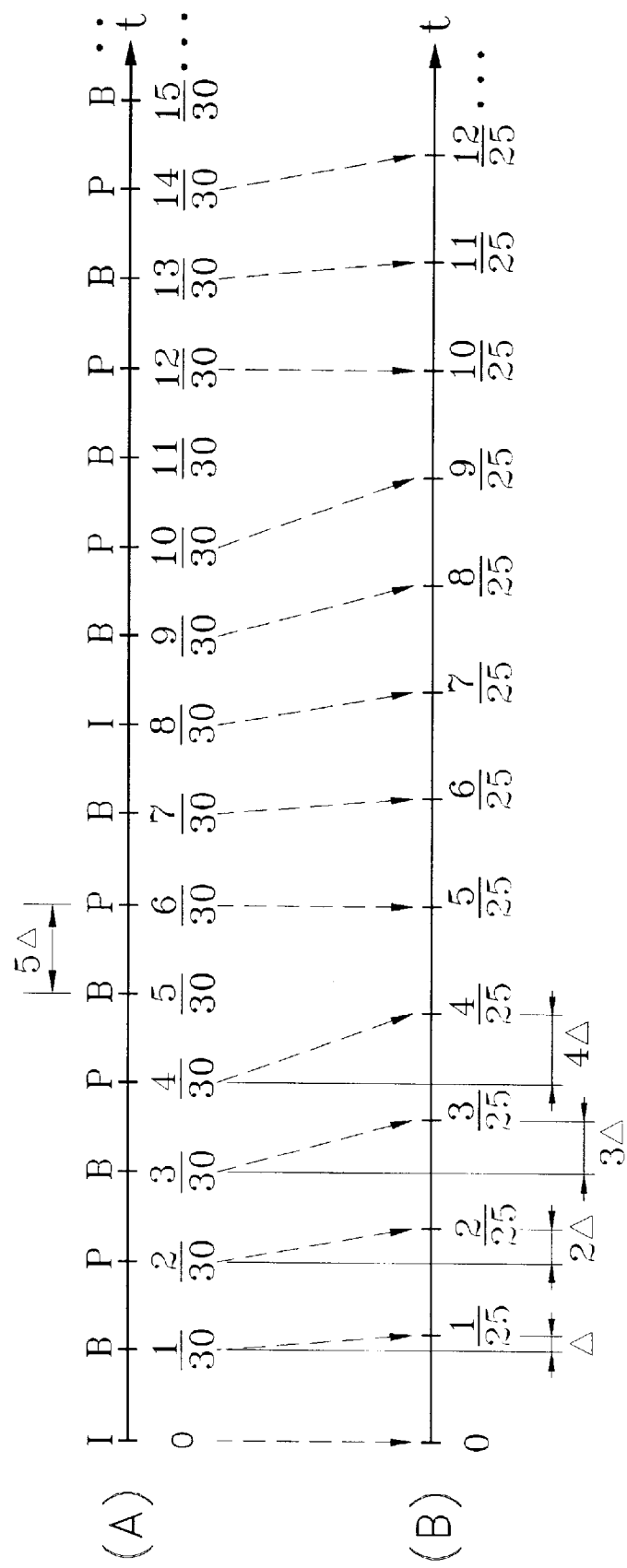
FIG. 3A is a view for explaining a frame rate transformation operation when the frame rate of an input bitstream is larger than that of an image display device.

An exemplary frame rate transformation operation in the case where the frame rate of the input bitstream is higher than that of the image display device is shown in FIG. 3A. FIG. 3A shows the case, for example, when the input bitstream of the NTSC standard is input to a TV receiver having an image display device of the PAL standard.

As shown by (A) in FIG. 3A, thirty frames per second are output in the NTSC standard. In other words, the interval between the frames becomes 1/30 of a second. Meanwhile, the image display device of the PAL standard outputs twenty-five frame per second on the screen. That is, each frame is output every 1/25 of a second. Thus, if an input bitstream is output according to the frame rate of the image display device, the last five frames of the input bitstream are output too late, to thereby make a real-time image output impossible.

In this particular example, the time period for outputting six frames of the input bitstream corresponds to that of the five frames in the image display device. Accordingly, if one frame is omitted every six frames in the frames of the input bitstream, the input bitstream can be output so as to match the frame rate of the image display device.

In more detail, as shown by (B) in FIG. 3A, once the I frame being a start frame of the GOP layer is output, the following frames are output asynchronously with the 1/30 seconds frame rate of the input bitstream, but according to the 1/25 seconds frame rate of the image display device. That is, the frames following the I frame are delayed by a predetermined time and then output so as to meet the frame rate of the image display device Here, assuming that an initial delay time is $\Delta$, the $\Delta$ corresponds to a difference ($=1/25-1/30$) between the interval of outputting the frame of the input bitstream and that of outputting the image in the image display device. In other words, the frames following the I frame sequentially accumulate delay time such as 1$\Delta$, 2$\Delta$, 3$\Delta$, ...

If the delay time is accumulated in this manner, the fifth frame of the input bitstream is displayed on the screen after 5$\Delta$, that is, 1/30 of a second corresponding to the frame rate of the input bitstream elapses from the displayed fourth frame. Thus, if the sixth frame of the input bitstream is omitted, the output point of time of the seventh frame thereof becomes coincident with the frame rate of the image display device. By repeating such an operation, the frame rate of the input bitstream can fit that of the image display device.

Here, it is desirable that the omitted frame be limited to a B frame, including its own least frame information, to thereby minimize the deterioration of picture quality due to frame omission.

In FIG. 2, the first operation unit 73 in the frame rate transformer 70 receives the first and second frame rates from the first and second frame rate generators 50 and 60, and calculates a threshold value for determining an omission point of time. The threshold value is for detecting when the delay time for outputting a predetermined frame of the input bitstream corresponds to an output interval 5$\Delta$ of the input bitstream. Accordingly, it is desirable that the threshold value be set to somewhat smaller value than the output interval 5$\Delta$ of the input bitstream. In the embodiment of the present invention, the first operation unit 73 calculates a time which is obtained by subtracting a reference delay time ($\Delta$) divided by two from an output interval of the input bitstream, and outputs the calculation result to the omission determiner 71. Thus, in this particular example, the threshold value (TH) equals:

$$TH = \frac{1}{30} - \frac{\Delta}{2} = \frac{1}{30} - \frac{1}{2}\left(\frac{1}{25} - \frac{1}{30}\right) = \frac{3}{60} - \frac{1}{50}$$

Meanwhile, the second operation unit 74 receives the first and second frame rates and calculates a reference delay time ($\Delta$) corresponding to the difference between the two frame rates to calculate a delay quantity per each frame and output the calculated delay quantity to the omission determiner 71.

The omission determiner 71 compares the threshold value received from the first operation unit 73 and the delay quantity calculated in the second operation unit 74 (erg., $\Delta$, 2$\Delta$, 3$\Delta$ etc.) If the delay quantity is not less than the threshold value, the omission determiner 71 judges whether the corresponding frame is a B frame. When it is judged that the delay quantity is not less than the threshold value and the corresponding frame is a B frame, the omission determiner 71 generates an omission control signal The decoder 20 serially outputs the image signal stored in the frame memory 30 to the image interface 40. However, the decoder 20 omits the next frame to be output to the image interfacer 40 when an omission control signal is input from the omission determiner 71, and outputs instead the following frame to the image interface 40. The image interface 40 outputs the decoded image output from the decoder 20 to the image display device, according to the frame rate generated from the frame rate generator 60.

Figure 3B:
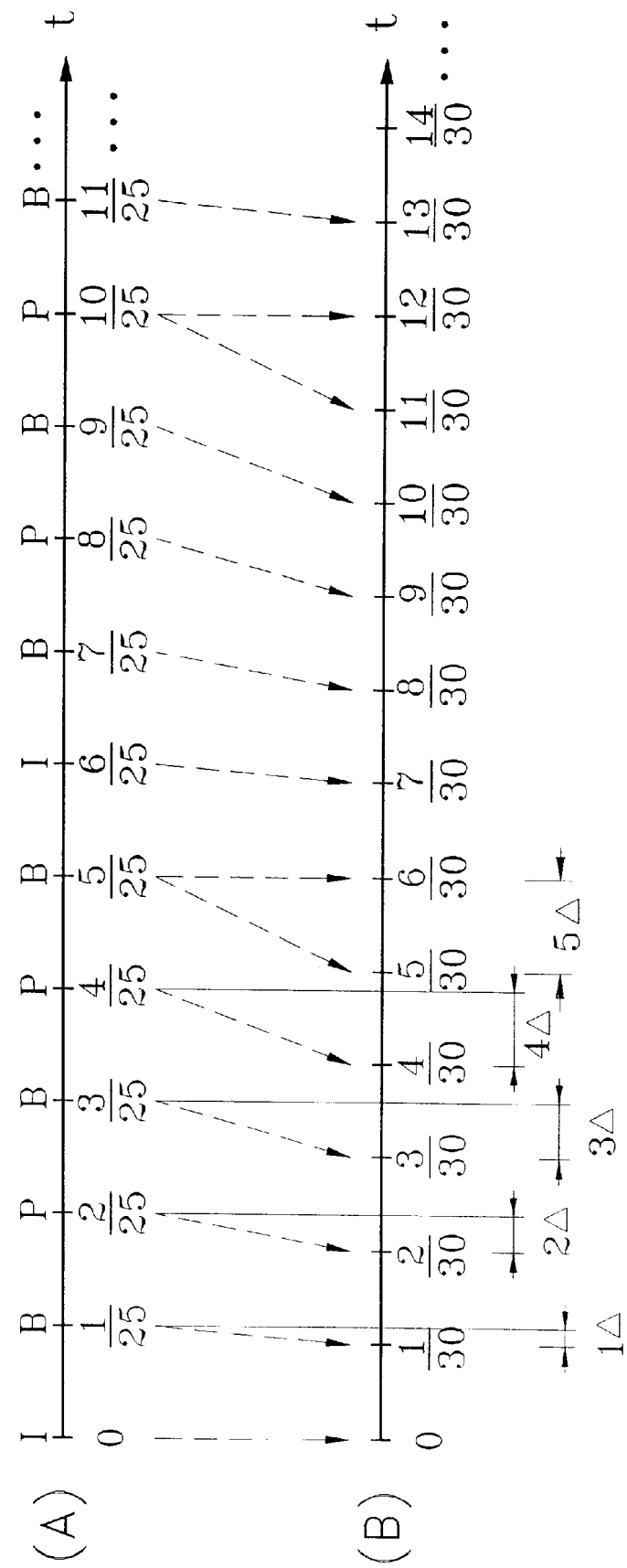
FIG. 3B is a view for explaining a frame rate transformation operation when the frame rate of an input bitstream is smaller than that of an image display device.

The operation of the preferred embodiment in the case where the frame rate of the input bitstream is smaller than the frame rate of the image display device is shown in FIG. 3B. FIG. 3B shows an example of the case where the TV receiver of the NTSC standard receives an input bitstream of the PAL standard. Through a reverse process of FIG. 3A, the frame rate can be transformed. That is, as shown in FIG. 3B, the output time of the five frames of the input bitstream corresponds to the output time of the six frames in the image display device. Thus, if the frame of the input bitstream repeats every five frames, the input bitstream can be output coincidentally with the frame rate of the image display device Here, the input bitstream should be output a predetermined time earlier than the frame output interval of the input bitstream, so that the input bitstream is output to have the frame rate of the image display device. The time-leading reference time uses the same Δ as that of the above-described reference delay time.

The repetition determiner 72 compares the threshold value input from the first operation unit 73 and the delay quantity calculated in the second operation unit 74 Here, the delay quantity becomes a negative value, that is, a reduced quantity. By comparison, if the reduced quantity is not less than the threshold value, the repetition determiner 72 generates a repetition control signal. When a repetition control signal is received from the repetition determiner 72, the decoder 20 again outputs a previously output frame to the image interface 40.

As described above, the decoding apparatus according to the present invention transforms an image signal having a frame rate different from that of the image display device into one having the frame rate of the image display device. As a result, an image having a frame rate different from that of the image display device can be displayed via the same-image display device.

While only certain embodiments of the invention have been specifically described herein, it will be apparent that numerous modifications may be made thereto without departing from the spirit and scope of the invention.

What is claimed is:

1. An image decoding apparatus which transforms an input bitstream of a coded image signal having a first frame rate to have a second frame rate, and outputs the transformed image signal, the image decoding apparatus comprising:

decoding means for decoding the coded image signal;

first frame rate generation means for generating a first reference frame rate, equal to said first frame rate, based on a predetermined reference clock signal;

second frame rate generation means for generating a second reference frame rate, equal to said second frame rate, based on the reference clock signal;

frame rate transformation means for receiving the first and second reference frame rates, respectively generated by said first and second frame rate generation means, and generating an omission control signal for omitting a selected frame output by the decoding means when the first reference frame rate is larger than the second reference frame rate, while generating a repetition control signal for repeating a selected frame output by the decoding means when the first reference frame rate is smaller than the second reference frame rate.

2. An image decoding apparatus which transforms an input bitstream of a coded image signal having a first frame rate to have a second frame rate and outputs the transformed image signal, the image decoding apparatus comprising:

decoding means for decoding the coded image signal;

first frame rate generation means for generating a first reference frame rate, equal to said first frame rate, based on a predetermined reference clock signal;

second frame rate generation means for generating a second reference frame rate, equal to said second frame rate based on the reference clock signal;

frame rate transformation means for receiving the first and second reference frame rates, respectively generated by said first and second frame rate generation means and generating an omission control signal for omitting a selected frame output by the decoding means when the first reference frame rate is larger than the second reference frame rate, while generating a repetition control signal for repeating a selected frame output by the decoding means when the first reference frame rate is smaller than the second reference frame rate, wherein said frame rate transformation means generates said omission and repetition control signals based on a delay time applied to the input bitstream so as to have the frame rate of said image display device.

3. The image decoding apparatus according to claim 2, wherein said frame rate transformation means generates an omission control signal when said delay time is not less than a predetermined threshold value.

4. The image decoding apparatus according to claim 2, wherein said frame rate transformation means generates an omission control signal when said delay time is not less than the predetermined threshold value and the corresponding frame is a bidirectionally-coded (B) frame.

5. The image decoding apparatus according to claim 2, wherein said frame rate transformation means generates a repetition control signal when a sign of said delay time is negative and the absolute value of said delay time is not less than a predetermined threshold value.

6. The image decoding apparatus according to claim 3, wherein said threshold value is set to be smaller than the period between two successive frames of the input bitstream.

7. The image decoding apparatus according to claim 5, wherein said threshold value is set to be smaller than the period between two successive frames of the input bitstream.

8. An image decoding apparatus which transforms an input bitstream of a coded image signal having a first frame rate to have a second frame rate, and outputs the transformed image signal the image decoding apparatus comprising:

decoding means for decoding the coded image signal;

first frame rate generation means for generating a first reference frame rate, equal to said first frame rate, based on a predetermined reference clock signal;

second frame rate generation means for generating a second reference frame rate, equal to said second frame rate, based on the reference clock signal;

frame rate transformation means for receiving the first and second reference frame rates, respectively generated by said first and second frame rate generation means, and generating an omission control signal for omitting a selected frame output by the decoding means when the first reference frame rate is larger than the second reference frame rate, while generating a repetition control signal for repeating a selected frame output by the decoding means when the first reference frame rate is smaller than the second reference frame rate, wherein said frame rate transformation means further comprises:

first operation unit for calculating a predetermined threshold value;

a second operation unit for calculating a delay time;

an omission determiner for receiving the threshold value and the delay time and generating an omission control signal when a sign of the delay time is positive and an absolute value thereof is larger than the threshold value; and a repetition determiner for receiving the threshold value and the delay time and generating a repetition control signal when a sign of the delay time is negative and an absolute value is larger than the threshold value.

* * * * *